(12) United States Patent
Tseng et al.

(10) Patent No.: US 9,164,623 B2
(45) Date of Patent: Oct. 20, 2015

(54) PORTABLE DEVICE AND KEY HIT AREA ADJUSTMENT METHOD THEREOF

(71) Applicant: HTC CORPORATION, Taoyuan, Taoyuan County (TW)

(72) Inventors: Huan-Chih Tseng, Taoyuan (TW); Kuan-Wei Li, Taoyuan (TW); Yi-Fan Chen, Taoyuan (TW); Hsueh-Chun Chen, Taoyuan (TW)

(73) Assignee: HTC CORPORATION, Taoyuan, Taoyuan County (TW)

( * ) Notice: Subject to any disclaimer, the term of this patent is extended or adjusted under 35 U.S.C. 154(b) by 199 days.

(21) Appl. No.: 13/781,071

(22) Filed: Feb. 28, 2013

(65) Prior Publication Data

US 2014/0098069 A1    Apr. 10, 2014

Related U.S. Application Data

(60) Provisional application No. 61/710,224, filed on Oct. 5, 2012.

(51) Int. Cl.
| | |
|---|---|
| *G06F 3/0488* | (2013.01) |
| *G06F 3/041* | (2006.01) |
| *G06F 1/16* | (2006.01) |
| *G06F 3/023* | (2006.01) |

(52) U.S. Cl.
CPC ............ *G06F 3/0418* (2013.01); *G06F 1/1626* (2013.01); *G06F 3/0236* (2013.01); *G06F 3/0237* (2013.01); *G06F 3/0238* (2013.01); *G06F 3/04886* (2013.01)

(58) Field of Classification Search
CPC .............. G06F 3/0236–3/0238; G06F 3/04886
See application file for complete search history.

(56) References Cited

U.S. PATENT DOCUMENTS

| | | | |
|---|---|---|---|
| 2004/0183833 A1 | 9/2004 | Chua | |
| 2010/0265181 A1* | 10/2010 | Shore | ............................ 345/168 |
| 2011/0181535 A1* | 7/2011 | Takayama | ...................... 345/173 |

FOREIGN PATENT DOCUMENTS

| | | |
|---|---|---|
| CN | 1954355 A | 4/2007 |
| TW | 201133279 A1 | 10/2011 |
| TW | 201135575 A1 | 10/2011 |
| TW | 201209646 A1 | 3/2012 |
| TW | 201224853 A1 | 6/2012 |
| TW | 201237727 A1 | 9/2012 |

* cited by examiner

*Primary Examiner* — Michael Pervan
(74) *Attorney, Agent, or Firm* — Muncy, Geissler, Olds & Lowe, P.C.

(57) ABSTRACT

A portable device and a key hit area adjustment method are provided. The portable device includes a touch screen and a processor coupled with the touch screen. The touch screen is configured to display an input method editor comprising a plurality of virtual keys. The processor is configured to detect an input event triggered via the input method editor and adjust key hit areas of the virtual keys in response to the input event. The key hit area adjustment method is applied to the portable device to implement the aforesaid operations.

8 Claims, 12 Drawing Sheets

PORTABLE DEVICE AND KEY HIT AREA ADJUSTMENT METHOD THEREOF

This application claims priority to U.S. Provisional Patent Application No. 61/710,224 filed on Oct. 5, 2012, which is hereby incorporated by reference in its entirety.

CROSS-REFERENCES TO RELATED APPLICATIONS

Not applicable.

BACKGROUND OF THE INVENTION

1. Field of the Invention

The present invention relates to a portable device and a key hit area adjustment method thereof. More particularly, the present invention relates to a portable device comprising a touch screen, which dynamically adjusts key hit areas of an input method editor displayed on the touch screen, and a key hit area adjustment method thereof.

2. Descriptions of the Related Art

Various portable devices (e.g., conventional mobile phones, smart phones, notebook computers, tablet computers, etc.) have become indispensable to everyday lives of modern people. Almost all portable device manufacturers have tried to design portable devices to keep up with consumer needs. Among these designs, combining touch screens with portable devices has been regarded as a requirement for people over recent years.

Touch screens may be integrated with portable devices to sense touch or the proximity of the users' fingers or touch objects (e.g., styluses) so that users can interact with portable devices via the touch screens. Due to the integration, conventional physical input keypads have been gradually replaced by various input method editors displayed on the touch screens, of which an example is the software keypad/keyboard (also known as the "screen keypad/keyboard").

In general, an input method editor displayed on a touch screen may comprise a plurality of virtual keys with fixed key hit areas to represent different characters, symbols, numbers, etc., or provide some specific functions. Nonetheless, various conditions such as different typing habits, different parallaxes, different finger sizes, different postures of holding a portable device, etc., make a problem that a virtual key which a user want to touch on is not actually touched by the user. In other words, these conditions make a deviation of the positions where the user actually touches and the user want to touch.

In view of this, efforts still have to be made in the art to provide a solution to the problem of mistyping on an input method editor displayed on a touch screen.

SUMMARY OF THE INVENTION

An objective of the present invention is to provide a solution to the problem of mistyping on an input method editor displayed on a touch screen. In order to solve the problem, the present invention detects input events triggered via the input method editor displayed on the touch screen and adjusts key hit areas of virtual keys of the input method editor in response to the input events. By this way, the present invention can obtain a deviation of the positions where the user actually touches and the user want to touch, under any conditions such as different typing habits, different parallaxes, different finger sizes, different postures of holding a portable device, etc. The present invention adjusts the key hit areas of the virtual keys of the input method editor according to the deviation as well.

To achieve the aforesaid objective, the present invention provides a portable device. The portable device comprises a touch screen and a processor coupled with the touch screen. The touch screen is configured to display an input method editor comprising a plurality of virtual keys. The processor is configured to detect an input event triggered via the input method editor and adjust key hit areas of the virtual keys in response to the input event.

To achieve the aforesaid objective, the present invention further provides a key hit area adjustment method for a portable device comprising a touch screen and a processor coupled with the touch screen. The key hit area adjustment method comprises the following steps of:

displaying an input method editor comprising a plurality of virtual keys by the touch screen;

detecting an input event triggered via the input method editor by the processor; and adjusting key hit areas of the virtual keys by the processor in response to the input event.

The detailed technology and preferred embodiments implemented for the present invention are described in the following paragraphs accompanying the appended drawings for persons skilled in this field to well appreciate the features of the claimed invention.

DESCRIPTION OF THE PREFERRED EMBODIMENT

The present invention can be explained with reference to the following embodiments. However, these embodiments are not intended to limit the present invention to any specific environments, applications or implementations described in these embodiments. Therefore, the description of these embodiments is only for the purpose of illustration rather than to limit the present invention. In the following embodiments and attached drawings, elements not directly related to the present invention are omitted from depiction; and dimensional relationships among individual elements in the attached drawings are illustrated only for ease of understanding but not to limit the actual scale.

Figure 1:
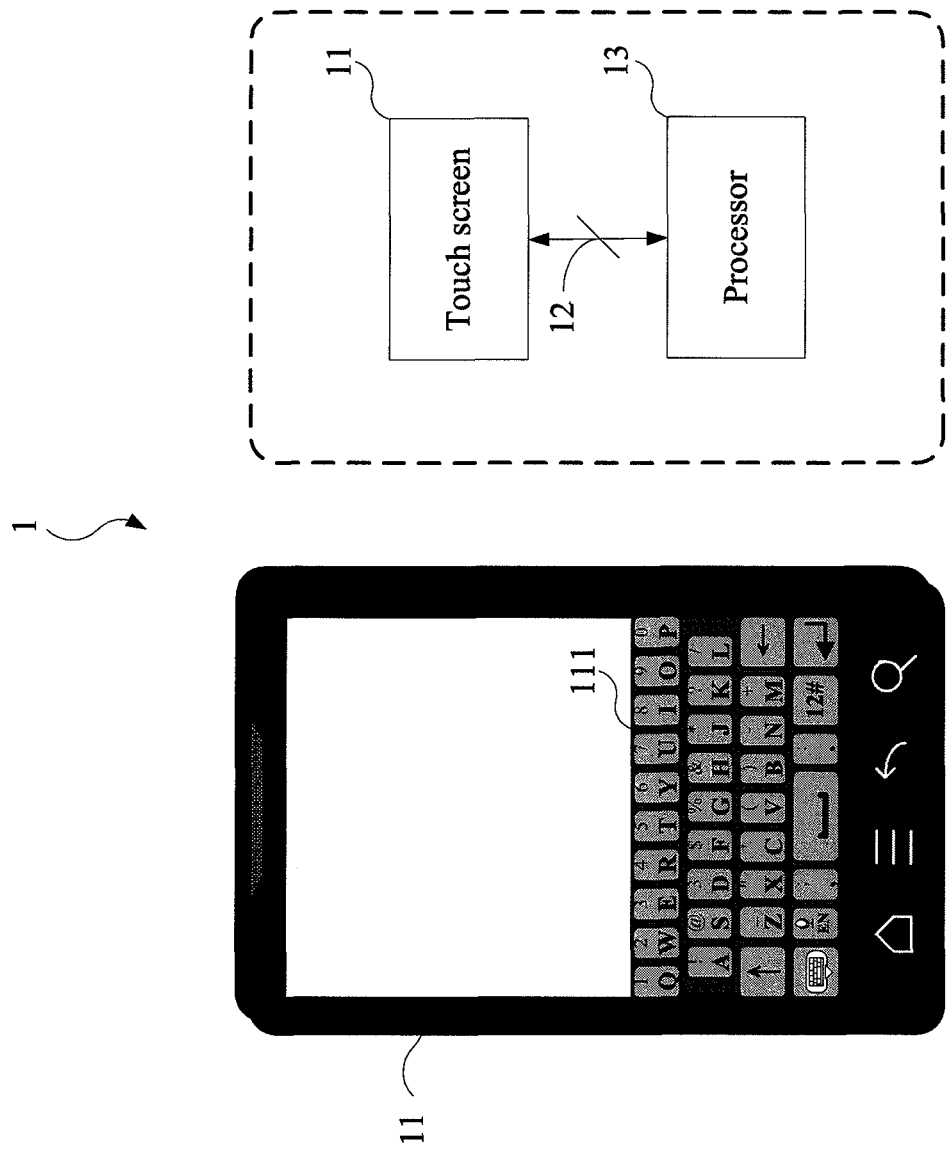
FIG. 1 is a schematic view illustrating a portable device according to a first embodiment of the present invention.

A first embodiment of the present invention is as shown in FIG. 1, which depicts a portable device 1. As shown in FIG. 1, the electronic device 1 may be a mobile phone, which comprises a touch screen 11 and a processor 13 coupled with the touch screen 11. In other embodiments, the portable device 1 may be a notebook computer, a tablet computer, a personal digital assistant (PDA), etc. Optionally, the portable device 1 may comprise a memory module coupled with the processor 13 for storing data in other embodiments.

Figure 2:
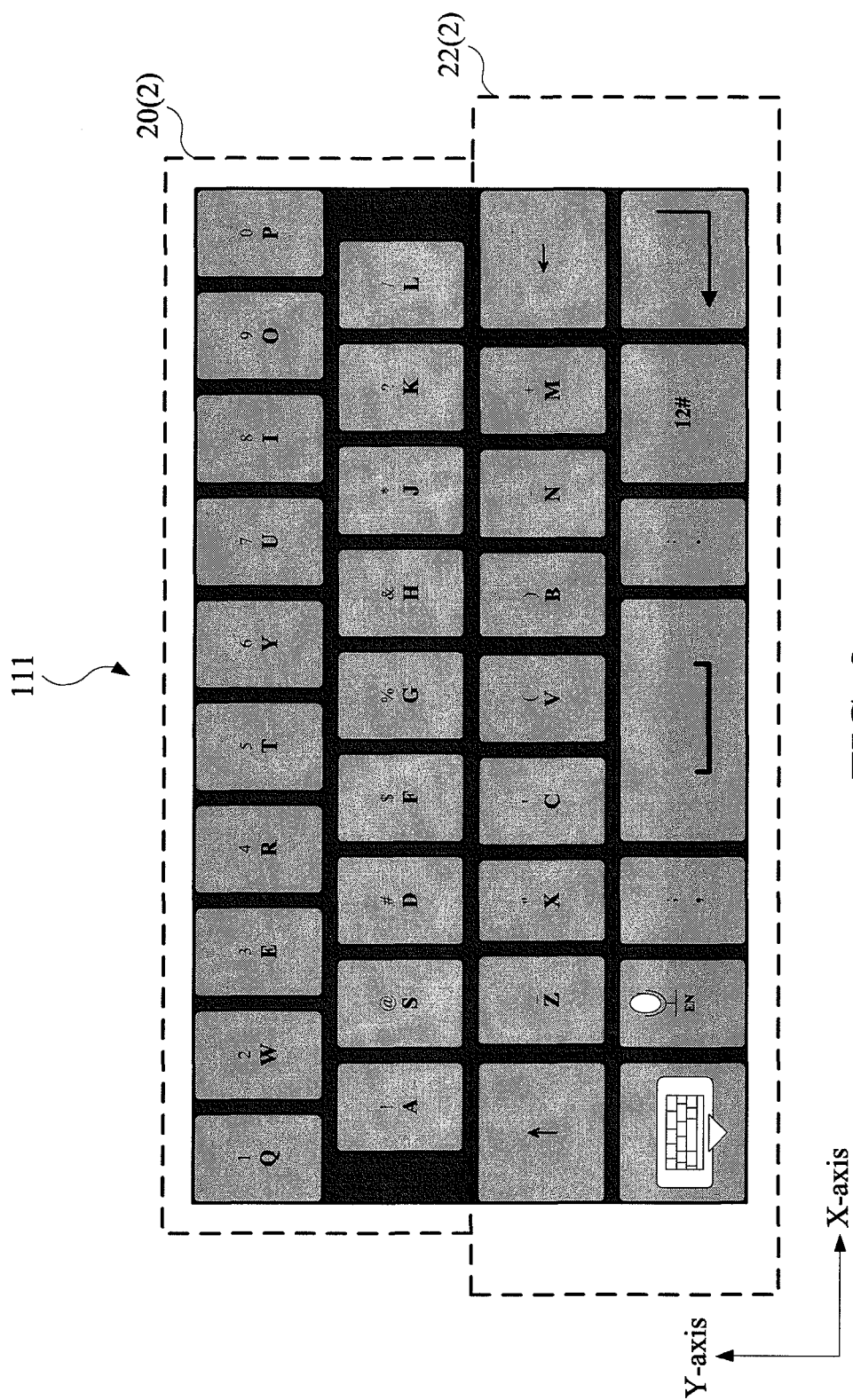
FIG. 2 is a schematic view illustrating an input method editor comprising a plurality of virtual keys according to the first embodiment of the present invention.

The touch screen 11 may be, for example, a capacitive touch screen, a resistive touch screen, a resistive-capacitive composite touch screen, an electromagnetic-induction touch screen, etc. As shown in FIG. 2, the touch screen 11 is configured to display an input method editor (IME) 111 comprising a plurality of virtual keys 2, and these virtual keys 2 may comprises a plurality of character keys 20 and a plurality of function keys 22, and other keys with different categories. Note that the profile of the input method editor 111 and the layout of the virtual keys 2 are only for the purpose of illustration rather than to limit the present invention.

Figure 3A:
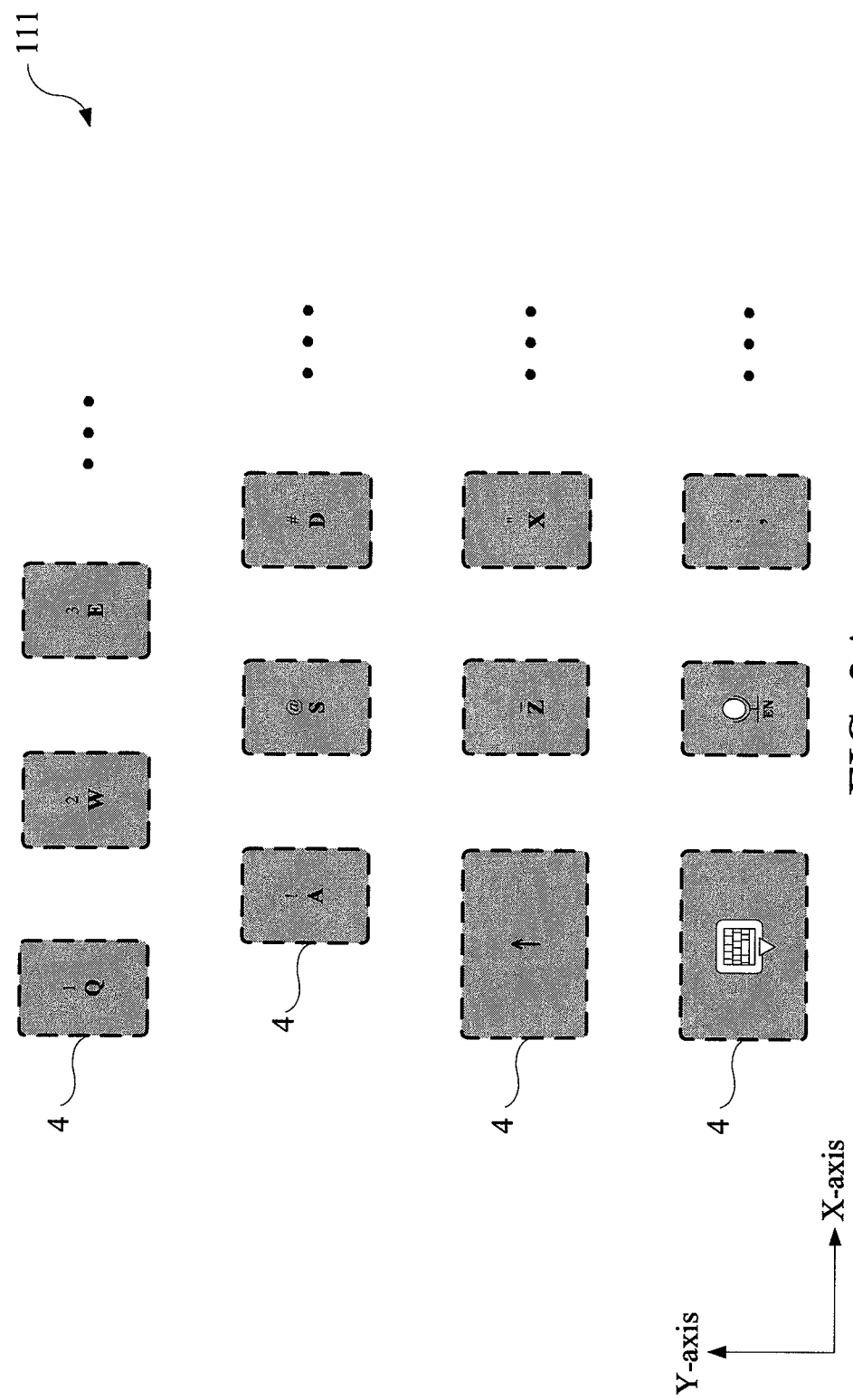
FIG. 3A is a schematic view illustrating key hit areas of the virtual keys according to the first embodiment of the present invention.

As shown in FIG. 3A, each of the virtual keys 2 has its own key hit area 4 which covers a specific rectangle area corresponding to its profile. In other embodiments, the key hit area 4 of each of the virtual keys 2 may cover a specific circle area whose center is located at the center of the corresponding virtual key 2. Alternatively, the key hit area 4 of each of the virtual keys 2 may cover an area corresponding to other shapes such as hexagon, octagon, polygon, etc.

Hereinafter, it is described how the portable device 1 detects an input event 12 triggered via the input method editor 111 and adjusts the key hit areas 4 of the virtual keys 2 in response to the input event 12. In this embodiment, the input event 12 means that a user wants to type a word via the input method editor 111 displayed on the touch screen 11. Thus, the processor 13 is configured to detect typing of the word and accordingly adjusts the key hit areas 4 of the virtual keys 2.

Figure 3B:
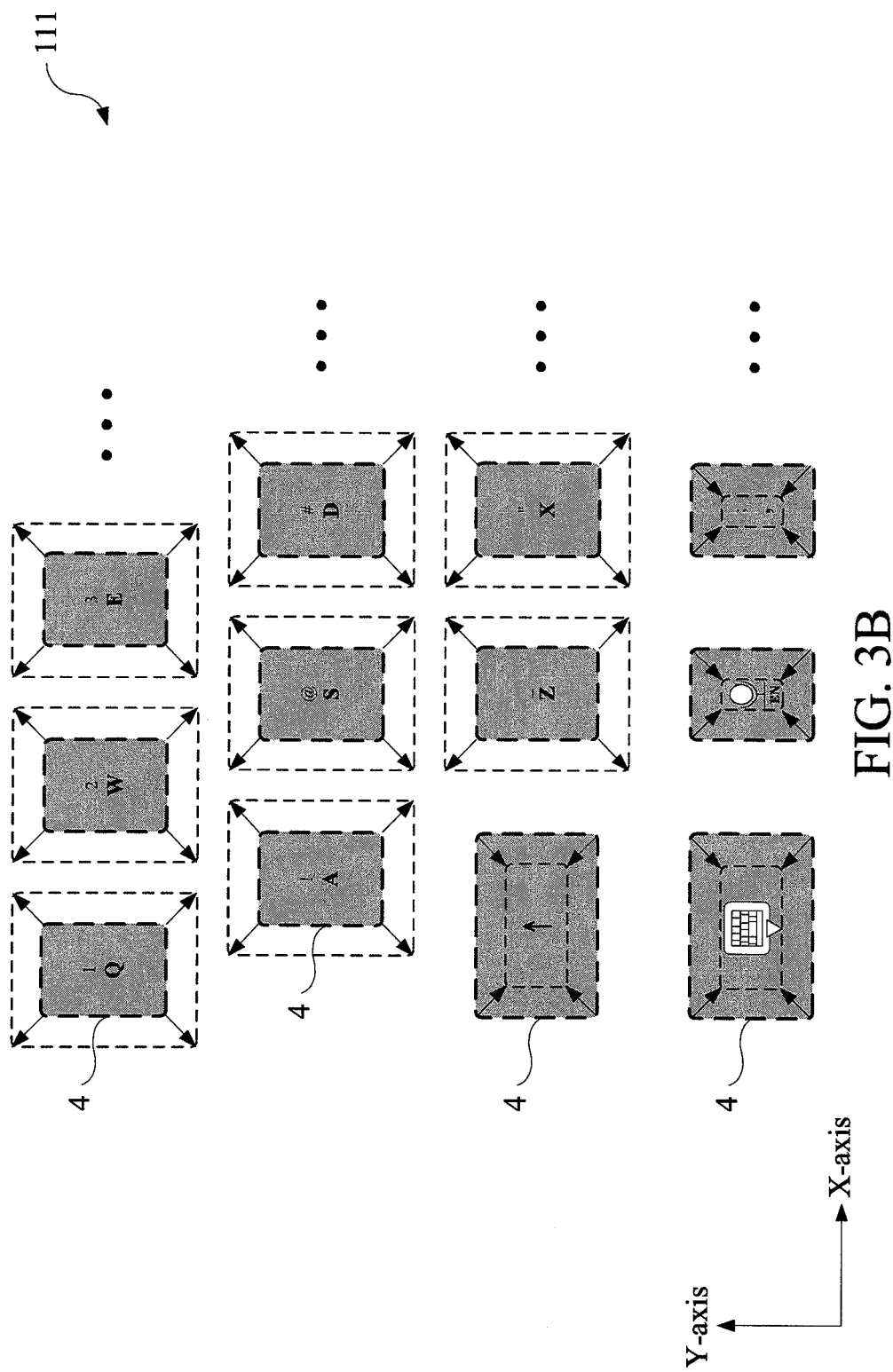
FIG. 3B is a schematic view illustrating an adjustment of the key hit areas of the virtual keys according to the first embodiment of the present invention.

At first, the processor 13 is configured to determine whether at least one character typed via the character keys 20 has formed a word. Specifically, the processor 13 may detect the current character typed via the character keys 20 and determine whether the current character combined with its preceding characters has formed a word. If the at least one character has not formed a word, the processor determines that the next input is still a character input rather than a function input. Therefore, as shown in FIG. 3B, the processor 13 enlarges the key hit areas 4 of the character keys 20 and reduce the key hit areas 4 of the function keys 22 so that the user could more readily type the next character of the word.

Figure 3C:
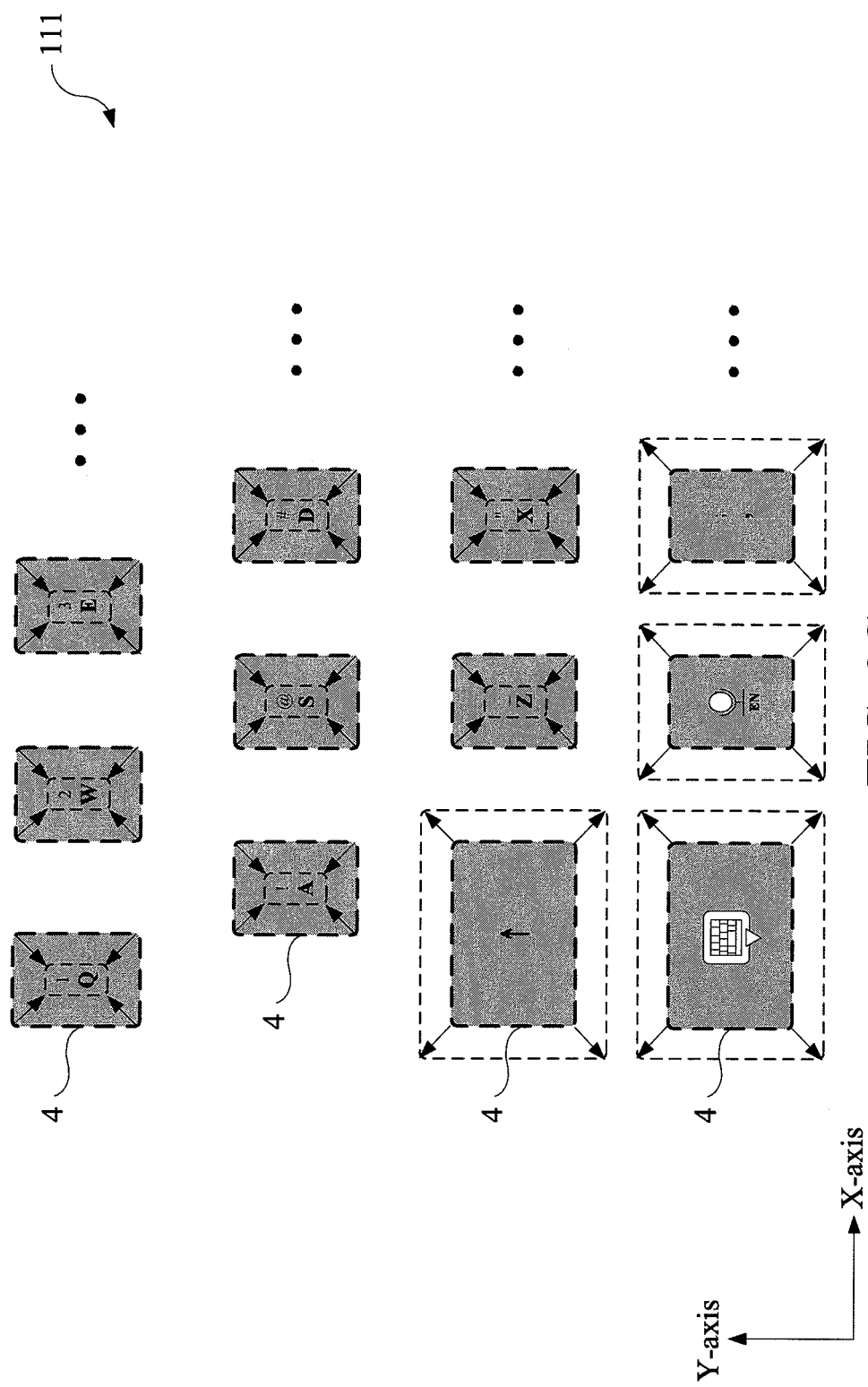
FIG. 3C is a schematic view illustrating another adjustment of the key hit areas of the virtual keys according to the first embodiment of the present invention.

Otherwise, as shown in FIG. 3C, if the at least one character has formed a word, the processor 13 may enlarge the key hit areas 4 of the function keys 22 and reduce the key hit areas 4 of the character keys 20. However, a complete word may be composed by more than one word or by one word with other character(s). For example, the complete word "keyboard" is composed by the word "key" and the word "board" and the other complete word "viewer" is composed by the word "view" and the characters "e" and "r".

Therefore, as the at least one character has formed a word, the processor 13 may firstly determine whether the word is complete before adjusting the key hit areas 4 of the virtual keys 2. In other words, the processor 13 enlarges the key hit areas 4 of the function keys 22 and reduces the key hit areas 4 of the character keys 20 after determining that the word is complete. In this way, it can be avoid that the next input should be a character but the key hit areas 4 of the function keys 22 has been enlarged and the key hit areas 4 of the character keys 20 has been reduced.

The processor 13 may comprises a candidate word engine (not shown) to generate candidate word information to enhance the convenience of typing. Specifically, the processor 13 may predict the next character(s) according to the typed character(s) and accordingly provides users with the candidate word information. Based on the candidate word information, the processor 13 may determine whether the word is complete. Note that the processor 13 may determine whether the word is complete via other methods which persons skilled in the art have known, and this is not attended to limit the implements of the present invention.

If the processor 13 determines that the word is incomplete, it is suggested that the next input should be a character input rather than a function input. As described above, the processor 13 may further predict a prediction character being subsequent to the word according to the candidate word information. Then, the processor 13 further determine whether the character key 20 corresponding to the prediction character is located next to anyone of the function keys 22.

If the character key 20 corresponding to the prediction character is not located next to anyone of the function keys 22, the processor 13 enlarges the key hit areas 4 of the character keys 20 and reduce the key hit areas 4 of the function keys 22, as shown in FIG. 3B. Otherwise, if the character key 20 corresponding to the prediction character is located next to anyone of the function keys 22, the processor 13 may recover the key hit areas 4 of the character keys 20 and the key hit areas 4 of the function keys 22, as shown in FIG. 3A.

The following is an example for further describing this embodiment. Note that the following example is only for the purpose of illustration rather than to limit the present invention. The example is based on a condition that a user wants to type the word "DUCK" via the input method editor 111.

Upon detecting the first character "D" which is typed via the input method editor 111, the processor 13 determines that the first character "D" has not formed a word yet, and thus the processor 13 enlarges the key hit areas 4 of the character keys 20 and reduce the key hit areas 4 of the function keys 22 as shown in FIG. 3B.

Next, upon detecting the second character "U" and the third character "C", the processor 13 determines that the character combinations "DU" and "DUC" both have not formed a word yet and thus the processor 13 still enlarges the key hit areas 4 of the character keys 20 and reduces the key hit areas 4 of the function keys 22, as shown in FIG. 3B. Then, upon detecting the fourth character "K", the processor 13 determines that the character combination "DUCK" has formed a word (i.e., the word "DUCK") and thus the processor 13 may further determine whether the word is complete according to candidate word information.

If the word "DUCK" is determined as being complete, the processor 13 enlarges the key hit areas 4 of the function keys 22 and reduces the key hit areas 4 of the character keys 20, as shown in FIG. 3C. Otherwise, if the word "DUCK" is determined as being incomplete, the processor 13 further determines whether the character key 20 corresponding to a prediction character being subsequent to the word is located next to anyone of the function keys 22.

As an example, the candidate word information suggests that the complete word which typed via the input method editor 111 is the word "DUCKBILL." Thus, the processor 13 determines that the prediction character being subsequent to the word "DUCK" is "B", and further determines that the character key 20 corresponding to the prediction character "B" is next to at least two of the function keys 22 (i.e., the function key "space" and the function key "circle"). Consequently, the processor 13 recover the key hit areas 4 of the character keys 20 and the key hit areas 4 of the function keys 22, as shown in FIG. 3A.

As another example, the candidate word information suggests that the complete word which typed via the input method editor 111 is the word "DUCKER." Thus, the processor 13 determines that the prediction character being subsequent to the word "DUCK" is "E", and further determines that the character key 20 corresponding to the prediction character "E" is not next to any of the function keys 22. Consequently, the processor 13 still enlarges the key hit areas 4 of the character keys 20 and reduces the key hit areas 4 of the function keys 22, as shown in FIG. 3B.

Based on the profile of the input method editor 111 and the layout of the virtual keys 2, once the prediction character being subsequent to a word is determined as one of the characters "A", "Z", "X", "C", "V", "B", "N", "M" and "L", the processor 13 recovers the key hit areas 4 of the character keys 20 and the key hit areas 4 of the function keys 22, as shown in FIG. 3A. Otherwise, the processor 13 enlarges the key hit areas 4 of the character keys 20 and reduces the key hit areas 4 of the function keys 22, as shown in FIG. 3B.

A second embodiment of the present invention is the portable device 1 as described in the first embodiment. Accordingly, for elements identical to those of the first embodiment, identical reference numerals will be used and descriptions thereof will be omitted herein. For the omitted descriptions, reference may be made to the aforesaid embodiment, and they will not be further described again herein.

The difference between the first embodiment and the second embodiment is described hereinafter. In this embodiment, the input event 12 means that a user typed some correct contents via the input method editor 111 displayed on the touch screen 11. Thus, the processor 13 is configured to detect the touch positions corresponding to the correct contents and accordingly adjusts the key hit areas 4 of the virtual keys 2.

In reality, every time a user wants to touch one of the virtual keys 2 for typing, those touch positions corresponding to the virtual key 2 may not always be the same. Instead, those touch positions may be distributed in the key hit area 4 of the virtual key 2. Therefore, the processor 13 is configured to detect and gather all the touch positions located in the key hit area 4 of the virtual key 2.

Specifically, every time the processor 13 detects a touch position located in the key hit area 4 of each of the virtual key 2, the processor 13 may record a two-dimensional coordinate (x,y) of the detected touch position. The coordinate of the touch position may be store in a memory module (not shown) coupled with the processor 13. In this way, the processor 13 can obtain all touch positions touched on each of the virtual keys 2 in response to the input event 12. Then, the processor 13 calculates a touch deviation for each of the virtual keys 2 according to the touch positions 6. Further, the processor 13 adjusts the key hit area 4 of each of the virtual keys 2 according to the corresponding touch deviation.

Figure 4:
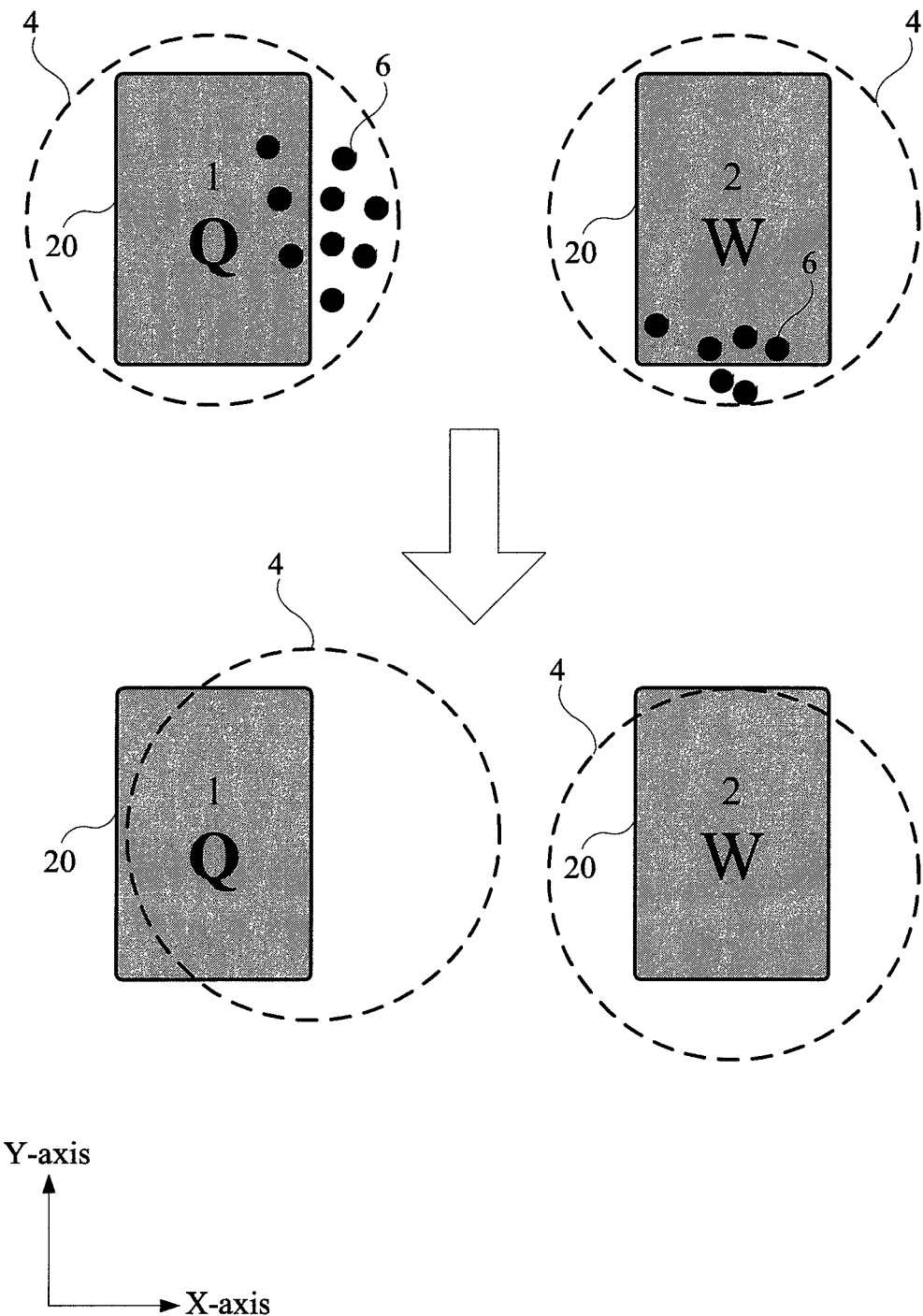
FIG. 4 is a schematic view illustrating an adjustment of the key hit areas of two virtual keys according to a second embodiment of the present invention.

Adjustment of the character keys "Q" and "W" is further described accompanying FIG. 4 as an example. It is assumed that the key hit area 4 of each of the virtual keys 2 covers a specific circle area whose center is located at the center of the corresponding virtual key 2. Note that this example is only for the purpose of illustration rather than to limit the present invention.

As shown in FIG. 4, a plurality of touch positions 6 located in the key hit areas 4 of the character keys "Q" and "W" have been touched by users, and the processor 13 has detected and recorded these touch positions 6. Therefore, the processor 13 can calculate a touch deviation for each of the character keys "Q" and "W" according to the corresponding touch positions 6 respectively. The processor 13 may calculate the touch deviations by calculating various statistics of the touch positions 6 of the character keys "Q" and "W", such as average values, variants, etc.

In other embodiments, upon calculating the statistics of the touch positions 6, a part of the touch positions 6 with larger deviations may be further discarded to obtain a more precise touch deviation. Note that the number of the touched positions 6 of the character keys "Q" and "W" shown in FIG. 4 is only for the purpose of illustration rather than to limit the present invention.

In view of the distribution of the touch position 6 located in the key hit area 4 of the character key "Q", the processor 13 may determine that the user always touches somewhere near the right part of the key hit area 4 of the character key "Q" when he wants to type the character "Q" via the input method editor 111. Therefore, the processor 13 dynamically adjusts the key hit area 4 of the character key "Q" toward the right side of the key hit area 4 of the character key "Q", as shown in FIG. 4.

On the other hand, in view of the distribution of the touch position 6 located in the key hit area 4 of the character key "W", the processor 13 may determine that the user always touches somewhere near the lower part of the key hit area 4 of the character key "W" when he want to type the character "W" via the input method editor 111. Therefore, the processor 13 dynamically adjusts the key hit area 4 of the character key "W" toward the lower side of the key hit area 4 of the character key "W", as shown in FIG. 4.

Note that all the operations described in this embodiment and that described in the first embodiment can be combined as a whole in other embodiments of the present invention. The method in which the portable device 1 simultaneously executes these operations can be readily appreciated by those of ordinary skill in the art based on the explanations of these embodiments, and thus will not be further described herein.

A third embodiment of the present invention is the portable device 1 as described in the first embodiment. Accordingly, for elements identical to those of the first embodiment, identical reference numerals will be used and descriptions thereof will be omitted herein. For the omitted descriptions, reference may be made to the aforesaid embodiment, and they will not be further described again herein.

The difference between the first embodiment and the third embodiment is described hereinafter. In this embodiment, the input event 12 means that a use generates incorrect touch for typing via the input method editor 111 displayed on the touch screen 11. Thus, the processor 13 is configured to detect and analyze the incorrect touch and accordingly adjusts the key hit areas 4 of the virtual keys 2.

In reality, every time a user wants to touch one of the virtual keys 2 for typing, he may mot touch the correct virtual key 2. Instead, he may touch another virtual key 2 which is next to the correct virtual key 2. Therefore, the processor 13 is configured to detect and analyze the incorrect touch and accordingly adjusts the key hit areas 4 of the virtual keys 2.

Two different applications are described as examples hereinafter. In the first application, the processor 13 obtains a word typed via the input method editor 111 in response to the input event 12. Next, the processor 13 predicts a reference word corresponding to the word. The processor 13 may predict the reference word according to candidate word information. Then the processor 13 compares the word with the reference word to determine whether a first character of the word is different from a second character of the reference word at the same character position.

If the character of the word is different from the second character of the reference word at the same character position, the processor 13 further determines whether the virtual key 2 corresponding to the first character is located next to the virtual key 2 corresponding to the second character in response that the first character is different from the second character. If the virtual key 2 corresponding to the first character is located next to the virtual key 2 corresponding to the second character, it is suggested that the user really mistyped the first character. Otherwise, the first character of the word is just different from the second character of the reference word rather than an incorrect character which the user mistyped.

Once it is determined that the first character is incorrect and the virtual key 2 corresponding to the first character is located next to the virtual key 2 corresponding to the second character, the processor 13 adjusts the key hit areas 4 of the virtual keys 2 corresponding to the first character and the second character in response to that the virtual key 2 corresponding to the first character is located next to the virtual key 2 corresponding to the second character.

Figure 5:
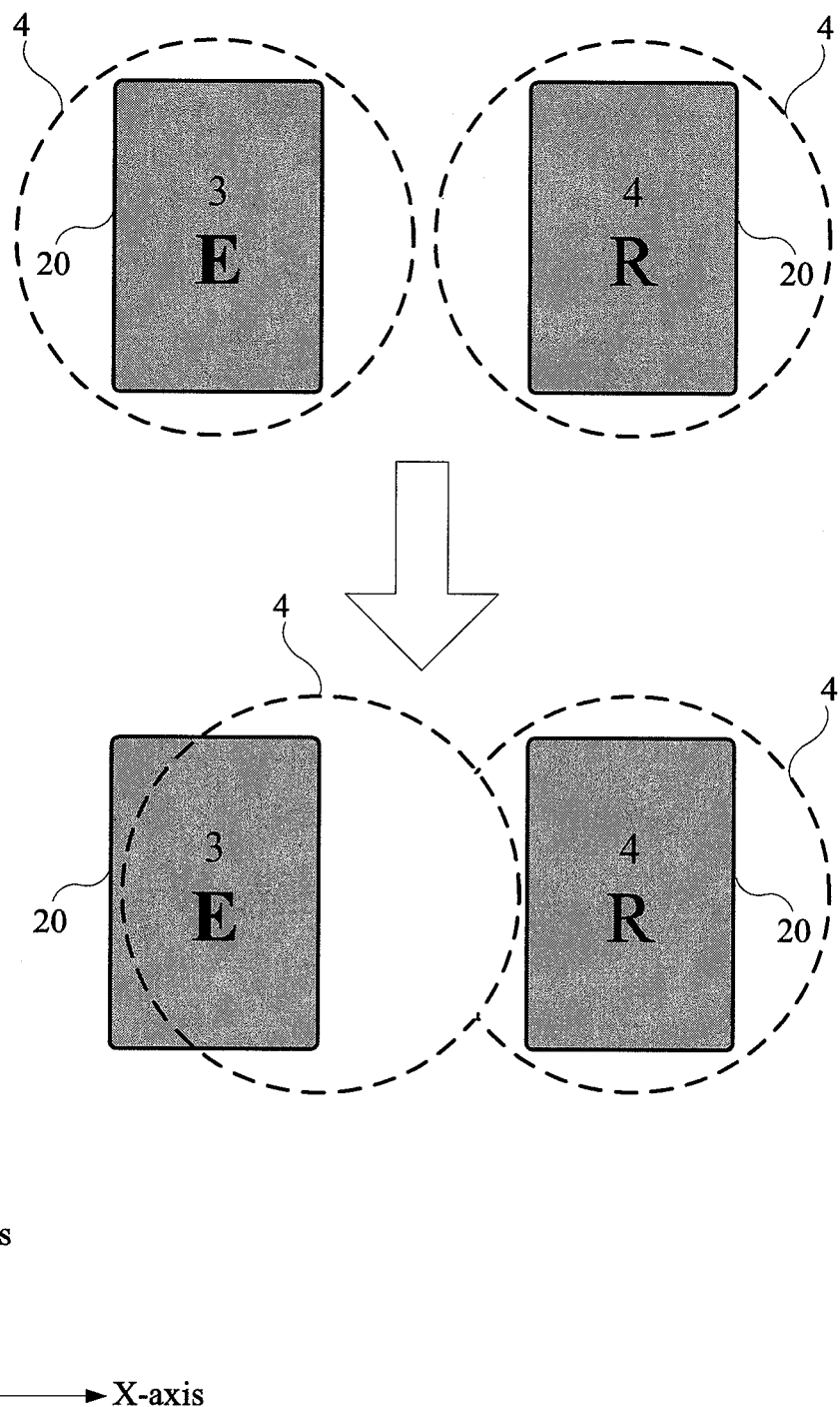
FIG. 5 is a schematic view illustrating an adjustment of the key hit areas of two virtual keys according to a third embodiment of the present invention.

As an example, a user wants to type the word "TEACHRR" via the input method editor 111, but he types the incorrect word "TEACHRR". This example is further described accompanying FIG. 5. As shown in FIG. 5, the key hit area 4 of each of the virtual keys 2 covers a specific circle area whose center is located at the center of the corresponding virtual key 2. Note that this example is only for the purpose of illustration rather than to limit the present invention.

Upon detecting the incorrect word "TEACHRR", the processor 13 predicts the word "TEACHER" as a reference word corresponding to the incorrect word "TEACHRR" according to candidate word information. Next, the processor 13 compares the incorrect word "TEACHRR" with the reference word "TEACHER", and the processor 13 determines that that the incorrect word "TEACHRR" and the reference word "TEACHER" have a different character at the penultimate character position. In other words, the penultimate character "R" of the incorrect word (i.e., "TEACHRR") is different from the penultimate character "E" of the reference word (i.e., "TEACHER").

Upon comparing the incorrect word "TEACHRR" with the reference word "TEACHER", the processor 13 further determines that the virtual key 2 corresponding to the first character (i.e., the penultimate character "R" of the incorrect word "TEACHRR") is located next to the virtual key 2 corresponding to the second character (i.e., the penultimate character "E" of the reference word "TEACHRR"). Thus, the processor 13 determines that the user mistyped the penultimate character "R" of the incorrect word "teachrr", and the correct character should be the character "E". It is suggested that the user may touches a position located in the key hit area 4 of the character key "R" when he wants to touch the character key "E".

Accordingly, the processor 13 may shift the key hit areas 4 of the virtual keys 2 corresponding to the second character (i.e., the character "E") toward the virtual keys 2 corresponding to the first character (i.e., the character "R") and reduce the key hit areas 4 of the virtual keys 2 corresponding to the second character (i.e., the character "R"), as shown in FIG. 5.

In the second application, the processor 13 obtains a first character typed via the input method editor 111 in response to the input event 12. The processor 13 also obtains a second character typed via the input method editor 111 instead of the first character in response to the input event 12. Next, the processor 13 determines whether the virtual key 2 corresponding to the first character is located next to the virtual key 2 corresponding to the second character. If the virtual key 2 corresponding to the first character is located next to the virtual key 2 corresponding to the second character, the processor 13 adjusts key hit areas 4 of the virtual keys 2 corresponding to the first character and the second character.

As an example, a user wants to type the word "TEACHER" via the input method editor 111, and he has typed the character combination "TEACH." Then, the user mistyped the character "R" as the input next to the character combination "TEACH", and subsequently deleted the incorrect character "R" and retyped the correct character "E" instead of the incorrect character "R." This example is described accompanying FIG. 5 as well. Note that this example is only for the purpose of illustration rather than to limit the present invention.

In this example, the processor 13 is configured to obtain a first character (i.e., the incorrect character "R") typed via the input method editor 111 and subsequently obtains a second character (i.e., the correct character "E") typed via the input method editor 111 instead of the first character. Upon obtaining the first character and the second character, the processor 13 further determines that the virtual key 2 corresponding to the first character is located next to the virtual key 2 corresponding to the second character. It is suggested that the user touches a position located in the key hit area 4 of the character key "R" when he wants to touch the character key "E".

Accordingly, the processor 13 may shift the key hit areas 4 of the virtual keys 2 corresponding to the second character (i.e., the character "E") toward the virtual keys 2 corresponding to the first character (i.e., the character "R") and reduce the key hit areas 4 of the virtual keys 2 corresponding to the first character (i.e., the character "R"), as shown in FIG. 5.

Note that all the operations described in this embodiment and that described in the preceding embodiments can be combined as a whole in other embodiments of the present invention. The method in which the portable device 1 simultaneously executes these operations can be readily appreciated by those of ordinary skill in the art based on the explanations of these embodiments, and thus will not be further described herein.

A fourth embodiment, a fifth embodiment, a sixth embodiment, a seventh embodiment and an eighth embodiment of the present invention are as shown in FIGS. 6, 7, 8, 9 and 10 respectively. Each of the embodiments is a key hit area adjustment method of the present invention. Each of the key hit area adjustment methods can be applied to a portable device comprising a touch screen and a processor coupled with the touch screen, e.g., the portable device 1 described in the preceding embodiments.

Figure 6:
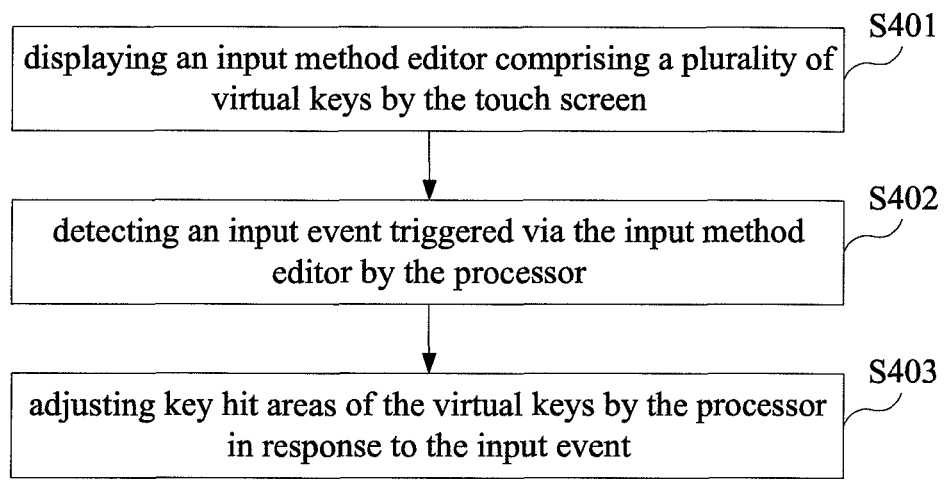
FIG. 6 is a flowchart diagram of a key hit area adjustment method according to a fourth embodiment of the present invention.

The key hit area adjustment method of the fourth embodiment comprises step S401, step S402 and step S403. As shown in FIG. 6, step S401 is executed to display an input method editor comprising a plurality of virtual keys by the touch screen. Step S402 is executed to detect an input event triggered via the input method editor by the processor. Step S403 is executed to adjust the key hit areas of the virtual keys by the processor in response to the input event.

Figure 7:
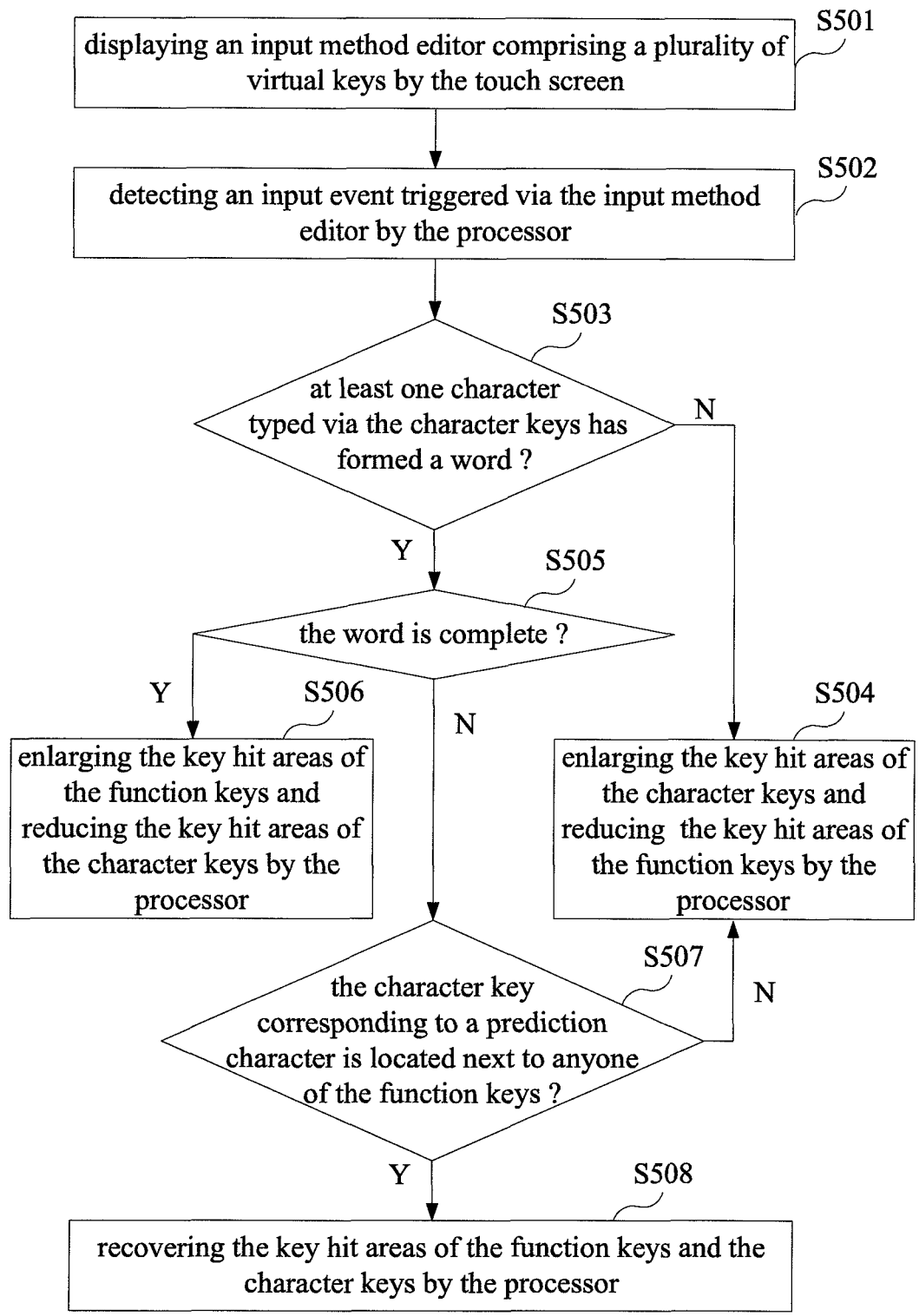
FIG. 7 is a flowchart diagram of a key hit area adjustment method according to a fifth embodiment of the present invention.

The key hit area adjustment method of the fifth embodiment comprises step S501, step S502, step S503, step S504, step S505, step S506, step S507 and step S508. As shown in FIG. 7, step S501 is executed to display an input method editor comprising a plurality of virtual keys by the touch screen. Step S502 is executed to detect an input event triggered via the input method editor by the processor. The virtual keys comprise a plurality of character keys and a plurality of function keys. Step S503 is executed to determining whether at least one character typed via the character keys has formed a word by the processor in response to the input event.

If the at least one character has not formed a word, step S504 is executed to enlarge key hit areas of the character keys and reduce key hit areas of the function keys by the processor. Otherwise, if the at least one character has formed a word, step S505 is executed to determine whether the word is complete by the processor.

If the word is complete, step S506 is executed to enlarge the key hit areas of the function keys and reduce the key hit areas of the character keys by the processor. Otherwise, if the word is incomplete, step S507 is executed to determine whether the character key corresponding to a prediction character being subsequent to the word is located next to anyone of the function keys by the processor.

If the character key corresponding to a prediction character is not located next to anyone of the function keys, step S504 is re-executed to still enlarge the key hit areas of the character keys and reduce the key hit areas of the function keys by the processor. Otherwise, if the character key corresponding to a prediction character is located next to anyone of the function keys, step S508 is executed to recover the key hit areas of the function keys and the character keys by the processor.

Figure 8:
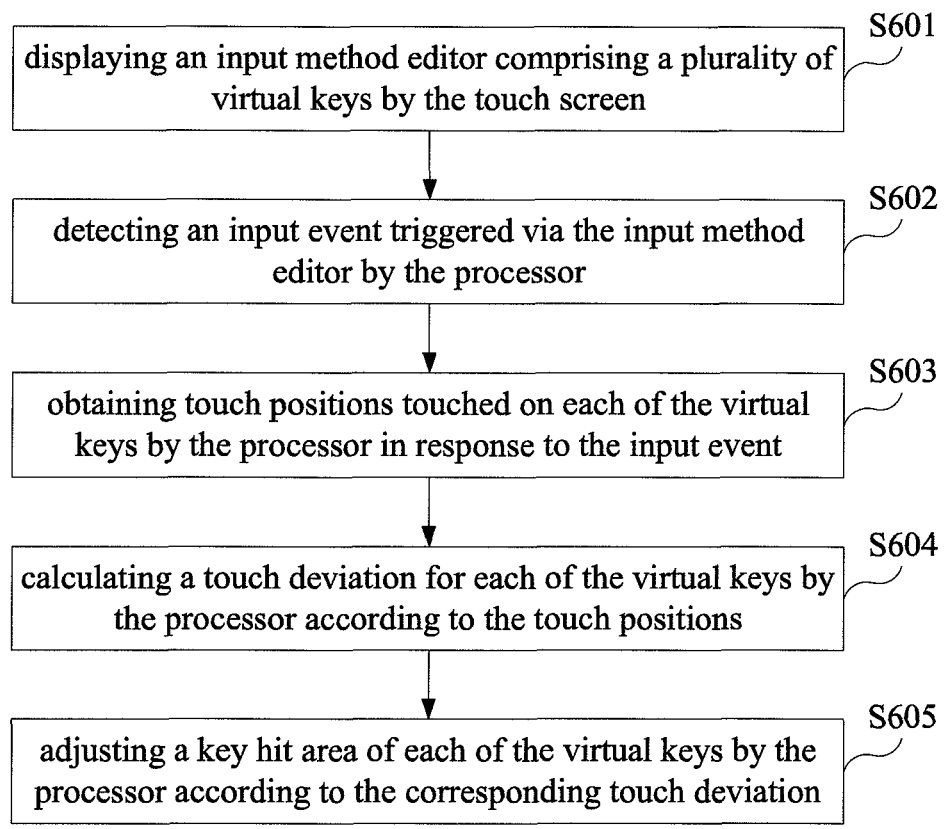
FIG. 8 is a flowchart diagram of a key hit area adjustment method according to a sixth embodiment of the present invention.

The key hit area adjustment method of the sixth embodiment comprises step S601, step S602, step S603, step S604 and step S605. As shown in FIG. 8, step S601 is executed to display an input method editor comprising a plurality of virtual keys by the touch screen. Step S602 is executed to detect an input event triggered via the input method editor by the processor. Step S603 is executed to obtain touch positions touched on each of the virtual keys by the processor in response to the input event. Step S604 is executed to calculate a touch deviation for each of the virtual keys by the processor according to the touch positions. Step S605 is executed to adjust a key hit area of each of the virtual keys by the processor according to the corresponding touch deviation.

Figure 9:
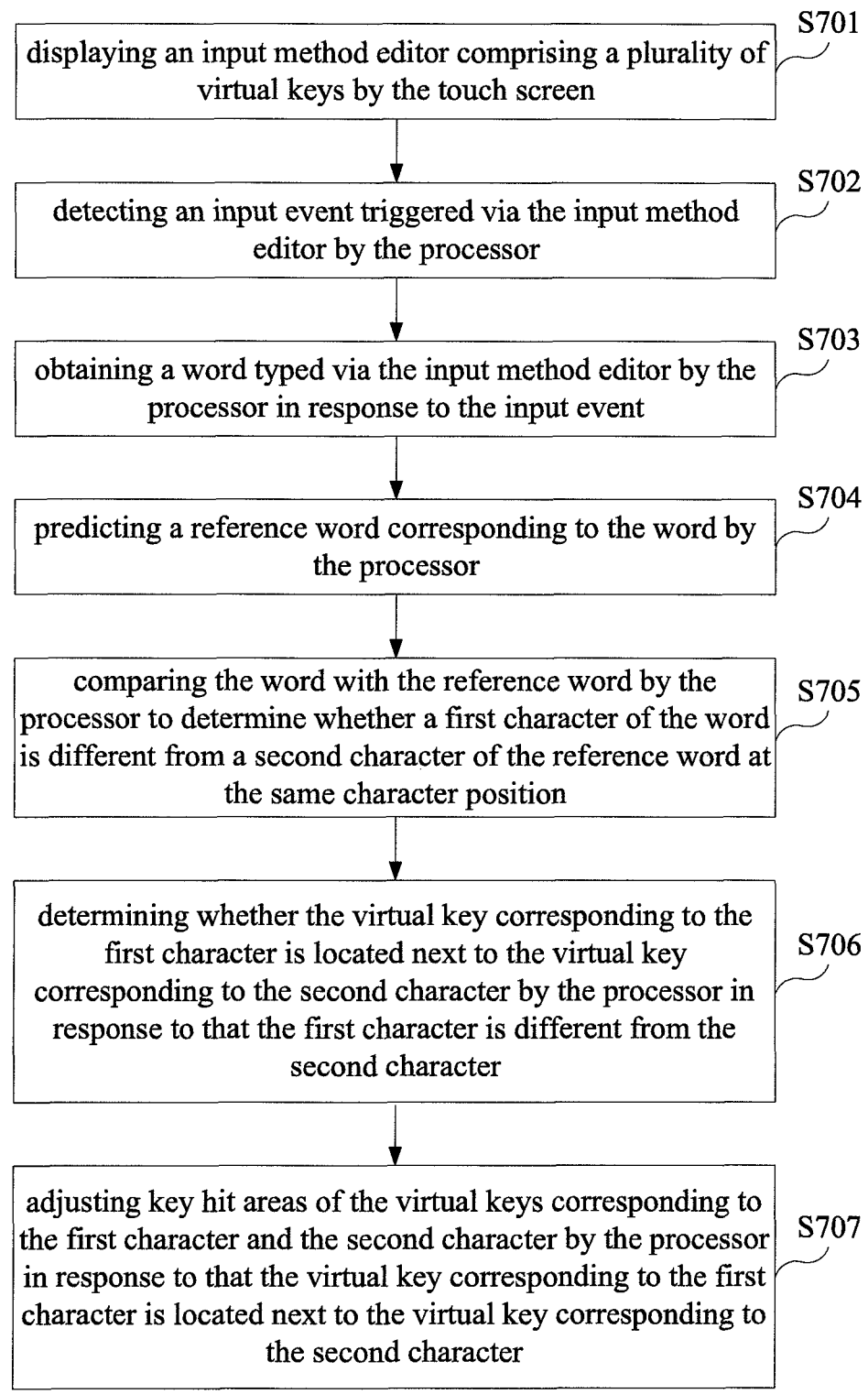
FIG. 9 is a flowchart diagram of a key hit area adjustment method according to a seventh embodiment of the present invention.

The key hit area adjustment method of the seventh embodiment comprises step S701, step S702, step S703, step S704, step S705, step S706 and step S707. As shown in FIG. 9, step S701 is executed to display an input method editor comprising a plurality of virtual keys by the touch screen. Step S702 is executed to detect an input event triggered via the input method editor by the processor. Step S703 is executed to obtain a word typed via the input method editor by the processor in response to the input event. Step S704 is executed to predict a reference word corresponding to the word by the processor.

Step S705 is executed to compare the word with the reference word by the processor to determine whether a first character of the word is different from a second character of the reference word at the same character position. Step S706 is executed to determine whether the virtual key corresponding to the first character is located next to the virtual key corresponding to the second character by the processor in response to that the first character is different from the second character.

Step S707 is executed to adjust key hit areas of the virtual keys corresponding to the first character and the second character by the processor in response to that the virtual key corresponding to the first character is located next to the virtual key corresponding to the second character.

Figure 10:
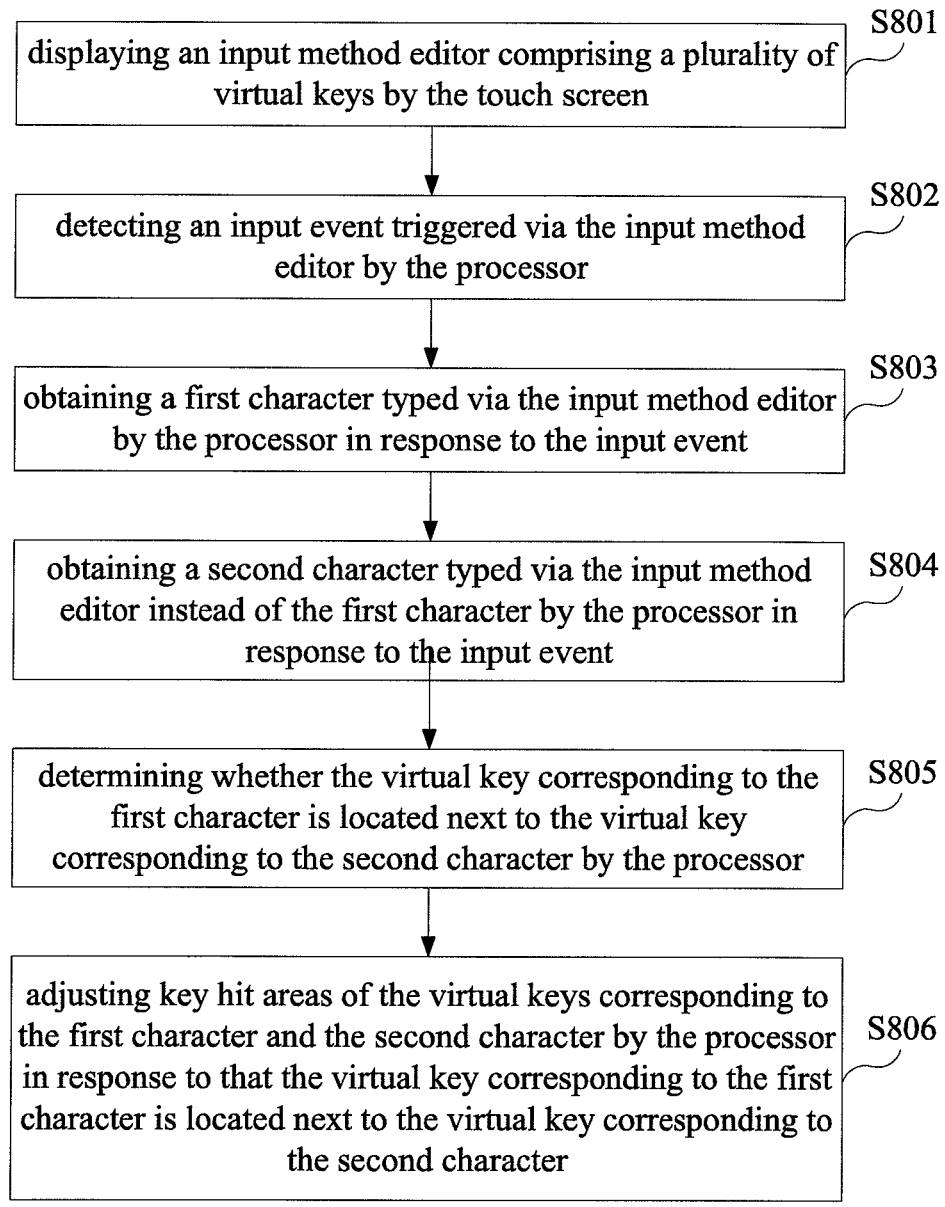
FIG. 10 is a flowchart diagram of a key hit area adjustment method according to a eighth embodiment of the present invention.

The key hit area adjustment method of the eighth embodiment comprises step S801, step S802, step S803, step S804, step S805 and step S806. As shown in FIG. 10, step S801 is executed to display an input method editor comprising a plurality of virtual keys by the touch screen. Step S802 is executed to detect an input event triggered via the input method editor by the processor. Step S803 is executed to obtain a first character typed via the input method editor by the processor in response to the input event. Step S804 is executed to obtain a second character typed via the input method editor instead of the first character by the processor in response to the input event.

Step S805 is executed to determine whether the virtual key corresponding to the first character is located next to the virtual key corresponding to the second character by the processor. Step S806 is executed to adjust key hit areas of the virtual keys corresponding to the first character and the second character by the processor in response to that the virtual key corresponding to the first character is located next to the virtual key corresponding to the second character.

In addition to the aforesaid steps, each of the fourth embodiment, the fifth embodiment, the sixth embodiment, the seventh embodiment and the eighth embodiment of the present invention can also execute all the operations of the portable device 1 set forth in the preceding embodiments and accomplish all the corresponding functions. The method in which these key hit area adjustment methods execute the operations and accomplish the corresponding functions can be readily appreciated by those of ordinary skill in the art based on the explanations of the aforesaid embodiments, and thus will not be further described herein.

According to the above descriptions, the present invention provides a portable device and a key hit area adjustment method thereof to solve the problem of mistyping on an input method editor displayed on a touch screen. The present invention detects input events triggered via the input method editor and adjusts key hit areas of the virtual keys of the input method editor in response to the input events. By this way, the present invention can obtain a deviation of the positions where the user actually touches and the user want to touch, under any conditions such as different typing habits, different parallaxes, different finger sizes, different postures of holding a portable device, etc. The present invention adjusts the key hit areas of the virtual keys of the input method editor according to the deviation as well.

The above disclosure is related to the detailed technical contents and inventive features thereof. Persons skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A portable device, comprising:
   a touch screen, being configured to display an input method editor comprising a plurality of virtual keys; and
   a processor, being coupled with the touch screen and configured to:
   detect an input event triggered via the input method editor; and
   adjust key hit areas of the virtual keys in response to the input event;

wherein the virtual keys include a plurality of character keys and a plurality of function keys, and the processor is further configured to determine whether at least one character typed via the character keys has formed a word in response to the input event to adjust the key hit areas of the virtual keys;

wherein the processor is further configured to determine whether the word is complete in response to that the at least one character has formed a word; and wherein the processor is further configured to:
 determine whether the character key corresponding to a prediction character being subsequent to the word is located next to anyone of the function keys in response to that the word is incomplete; and
 enlarge key hit areas of the character keys and reduce the key hit areas of the function keys in response to that the character key corresponding to the prediction character is not located next to anyone of the function keys.

2. The portable device as claimed in claim 1, wherein the processor is further configured to determine whether the word is complete according to candidate word information.

3. The portable device as claimed in claim 1, wherein the processor is further configured to enlarge key hit areas of the function keys and reduce key hit areas of the character keys in response to that the word is complete.

4. The portable device as claimed in claim 1, wherein the processor is further configured to enlarge key hit areas of the character keys and reduce key hit areas of the function keys in response to that the at least one character has not formed a word.

5. A key hit area adjustment method for a portable device, the portable device comprising a touch screen and a processor coupled with the touch screen, the key hit area adjustment method comprising the following steps of:
 (a) displaying an input method editor comprising a plurality of virtual keys by the touch screen;
 (b) detecting an input event triggered via the input method editor by the processor; and
 (c) adjusting key hit areas of the virtual keys by the processor in response to the input event;

wherein the virtual keys include a plurality of character keys and a plurality of function keys, and the step (c) further comprises the following step of:
 (c1) determining whether at least one character typed via the character keys has formed a word by the processor in response to the input event to adjust the key hit areas of the virtual keys;

wherein the step (c) further comprises the following step of:
 (c2) determining whether the word is complete in response to that the at least one character has formed a word; and wherein the step (c) further comprises the following steps of:
 (c3) determining whether the character key corresponding to a prediction character being subsequent to the word is located next to anyone of the function keys by the processor in response to that the word is incomplete; and
 (c4) enlarging key hit areas of the character keys and reducing key hit areas of the function keys by the processor in response to that the character key corresponding to the prediction character is not located next to anyone of the function keys.

6. The key hit area adjustment method as claimed in claim 5, wherein the processor determines whether the word is complete according to candidate word information.

7. The key hit area adjustment method as claimed in claim 5, wherein the step (c) further comprises the following step of:
 (c3) enlarging key hit areas of the function keys and reducing key hit areas of the character keys by the processor in response to that the word is complete.

8. The key hit area adjustment method as claimed in claim 5, wherein the step (c) further comprises the following step of:
 (c2) enlarging key hit areas of the character keys and reducing key hit areas of the function keys by the processor in response to that the at least one character has not formed a word.

* * * * *